Patented Mar. 7, 1944

2,343,769

UNITED STATES PATENT OFFICE 2,343,769

ALIPHATIC AMINOACYL COMPOUND AND METHOD FOR PREPARING SAME

Hugh William Gray, Wilmington, Del., assignor to E. I. du Pont de Nemours & Company, Wilmington, Del., a corporation of Delaware No Drawing. Application September 27, 1941, Serial No. 412,603

4 Claims. (Cl. 260—404)

This invention relates to certain new long chain aliphatic aminoacyl compounds and to methods for their preparation.

Alpha-amino acids in general undergo bimolecular condensation to give diketopiperazines, while the beta-amino acids invariably undergo deamination with formation of the alpha, beta-unsaturated acid. As disclosed in application Serial No. 327,324, filed April 1, 1940, by W. E. Hanford (now Patent No. 2,312,966, dated March 2, 1943), long chain amino acids having a radical length of at least seven are readily condensed intermolecularly to give linear polyamides of high molecular weight. In striking contrast, the long chain amino acids of the present invention exhibit a specific intramolecular condensation when subjected to elevated temperatures. Remarkable stability is evident in that deamination does not occur, formation of the cyclic lactam being the favored reaction. This pronounced difference in reactivity establishes this new found class of long chain acid compounds as fundamentally different from the long chain amino acid types of the prior art.

This invention comprises the discovery of a new class of aliphatic monoaminomonoacyl compounds having a chain length of at least 16 atoms, the amino group being attached to a carbon atom in the chain which is gamma or delta with respect to the acyl carbon. Such compounds may be represented by the formula

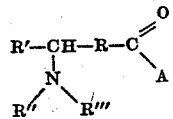

where R is a bivalent open chain organic radical containing two to three atoms in contiguous relation, R' is a monovalent open chain organic radical, R'' and R''' are hydrogen or monovalent open chain organic radicals, and R and R' are so chosen that the chain length R'—CH—R—C is at least 16 atoms and the radical length N—C—R—C is 5 or 6 atoms. A is selected from the class of OH, OM, or OR$^{IV}$,

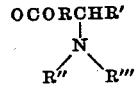

NH$_2$ or ONH$_4$ where M denotes a metal, R$^{IV}$ an open chain hydrocarbon radical, and R, R', R'' and R''' are as indicated above. R, R', R'' and R''' may be heteroatomic containing oxygen, nitrogen, or sulfur in addition to carbon and hydrogen. The preferred compounds are the acids in which R'' and R''' are hydrogen, which have chain lengths of 16-22 atoms, and a radical length of 5 or 6, e. g., 4-aminostearic acid.

The aminoacyl compounds of this invention can be prepared from the corresponding keto acids or keto acid derivatives by catalytic hydrogenation, in the presence of ammonia or primary or secondary amines, at elevated temperatures and superatmospheric pressures. According to one embodiment of this invention, the conversion can be effected by bringing into intimate contact in the presence of a suitable hydrogenation catalyst, e. g., nickel, at a temperature between 120° and 150° C., and at a pressure between 1500 and 2500 pounds per square inch the ketoacyl compound, hydrogen, and either ammonia or a primary or secondary amine as described in the copending application of M. W. Farlow, Serial No. 346,144, filed July 18, 1940 now Patent No. 2,323,806, issued July 6, 1943. The ketoacyl compound can be used as the free acid, anhydride, inorganic salt, ester or amide. Alternatively, the reduction can be accomplished chemically by treatment with formamide-forming reactants, e. g., [(NH$_4$)$_2$CO$_3$+HCOOH] in accordance with the general procedure, as applied to short chain ketones, by Leuckart, Berichte, 18, 2341 (1885).

The aminoacyl derivative obtained by this hydrogenation reaction is isolated and purified as described in the copending application of E. L. Martin, Serial No. 346,139, filed July 18, 1940, U. S. Patent 2,283,683, issued May 19, 1942. The aminoacyl derivative is converted to the amino acid by hydrolytic procedures, the amino acid being purified by recrystallization from organic solvents or by reprecipitation from aqueous organic acid solution as described in the aforementioned application of E. L. Martin.

The examples which follow set forth certain well defined instances of the application of this invention and are to be considered as illustrating and not as limiting this invention. Unless otherwise specified, the quantities of the ingredients used are given as parts by weight.

Example

A mixture of 20 parts of 4-ketostearic acid (melting point 92° to 94° C., obtained from oiticica oil as described in Example I in U. S. Patent No. 2,121,580), 0.5 part of ammonium chloride, 2.8 parts of sodium hydroxide, 2 parts of an alloy-skeleton nickel catalyst, 56 parts of methanol, and 70 parts of water is heated in a shaker tube with 30 parts of anhydrous ammonia at 130° C.

for 2 hours, and then treated with hydrogen at 2000 lbs./sq. in. for 3 hours at the same temperature. The solid product is dissolved in 2000 parts of hot 10% aqueous sodium hydroxide solution and the catalyst removed by filtration. The pH of the filtrate is adjusted to 7 by addition of acid, the precipitate which forms is removed by filtration, washed with water, dissolved in 200 parts of warm 25% formic acid, the solution treated with charcoal, and filtered. The filtrate is made alkaline with ammonium hydroxide, and the resulting white precipitate separated (12 parts, melting point 137° to 141° C.). Repeated crystallization from 80% tertiarybutanol gives 6 parts of 4-aminostearic acid melting at 164° to 165° C.

*Anal.*—Calcd. for $C_{18}H_{37}O_2N$: N, 4.68; neutralization equivalent 299.5. Found: N, 4.58; neutralization equivalent 296.4.

A small portion of 4-aminostearic acid is heated in vacuo at 255° C. Complete sublimation occurs, the sublimate melting at 86° to 87° C. after recrystallization from tertiarybutanol. The material is characterized by its insolubility in aqueous alkali and in aqueous formic acid, and its neutrality in ethanol benzene solution. This material is 4-stearolactam.

*Anal.*—Calcd. for stearolactam, $C_{18}H_{35}ON$: N, 4.98. Found: N, 4.58.

The desired aminoacyl compound can be prepared from the corresponding ketoacyl compound by employing the latter as the free acid, amide, ester, anhydride or inorganic salt. The derivatives thus obtained can be converted by standard hydrolytic procedures to the corresponding amino acid.

Although ammonia is used in the above example, in place thereof there can be used a primary or secondary amine in which event the product will be the N-alkylamino acids.

In general any hydrogenating-dehydrogenating catalyst such as nickel, cobalt, iron, copper, cadmium, zinc, tin, platinum, palladium, or silver is satisfactory, although nickel catalysts are preferred.

Although the hydrogenation pressures used in the above example range from 1500–2500 lbs./sq. in., these figures should not be constructed as critical. In general the upper limit of pressure is determined mainly by the type of apparatus used and the lower limit approximates the partial pressure of ammonia at the temperature employed.

The processes of this invention can be carried out at temperatures from about 25–200° C. When the reduction is carried out catalytically, temperatures in the range of 130° to 150° C. are generally employed.

Various times may be allotted to the hydrogenation reaction, from 1–5 hours usually being sufficient. A period of initial heating with ammonia before introduction of hydrogen is sometimes desirable, but is not necessary since satisfactory results are obtained by simultaneous admission of hydrogen and ammonia or the amine to the reaction mixture.

The amino acids produced in accordance with the processes of this invention can be purified as described in application Serial No. 346,139, filed July 18, 1940, by E. L. Martin, now U. S. Patent 2,283,683, issued May 19, 1942.

In conducting the chemical reduction various substituted formamides and formamide producing materials can be used; for example, ammonium formate is a very satisfactory reducing agent since it liberates formamide under the reacting conditions described herein.

Amino acid derivatives other than those disclosed in the specific example may be made in accordance with the general procedure outlined above. Such amino acid derivatives include the following:

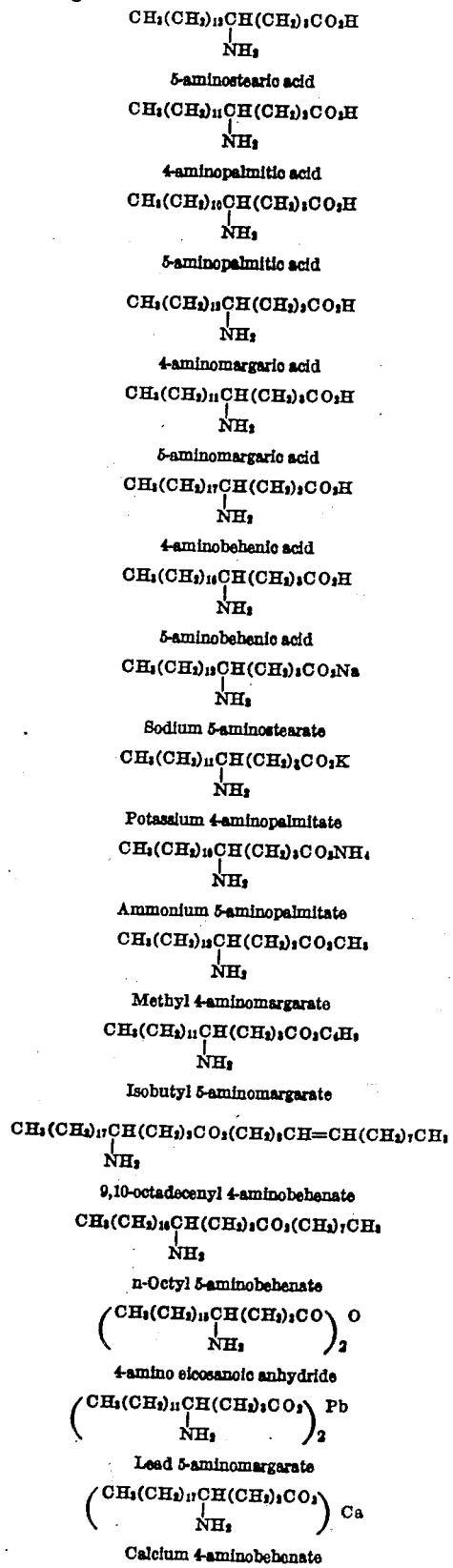

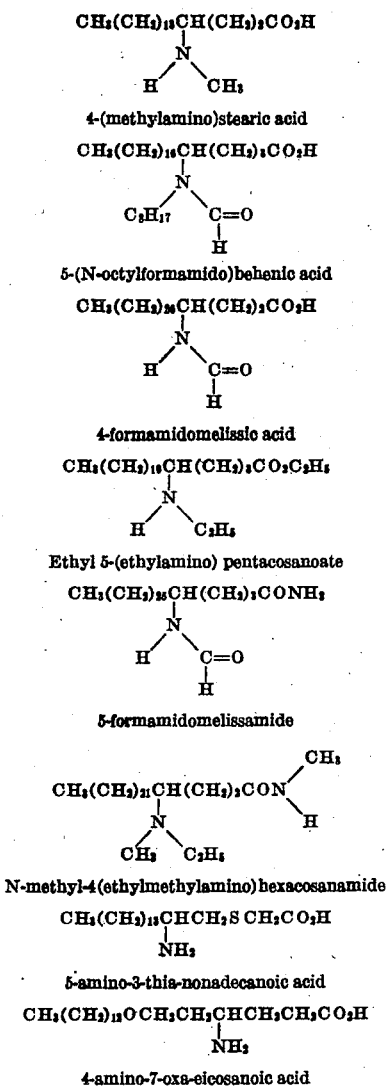

4-(methylamino)stearic acid 5-(N-octylformamido)behenic acid 4-formamidomelissic acid Ethyl 5-(ethylamino) pentacosanoate 5-formamidomelissamide N-methyl-4-(ethylmethylamino)hexacosanamide 5-amino-3-thia-nonadecanoic acid 4-amino-7-oxa-eicosanoic acid Long chain aminoacyl compounds of the type described herein are useful intermediates in the preparation of pharmaceuticals, insecticides and pesticides, surface-active compounds for use as detergents or emulsifiants, or as components of polymeric materials, such as polyamides, which are of value as textile fibers, coating compositions, unsupported sheeting, ribbons or films.

As many apparently widely different embodiments of this invention may be made without departing from the spirit and scope thereof, it is to be understood that this invention is not to be limited to the specific embodiments shown and described.

I claim:

1. An aliphatic monoaminomonoacyl compound having a chain length of at least 16 atoms, selected from the class consisting of carbon atom chains and chains containing in addition to carbon an atom from the group consisting of oxygen and sulfur, the amino group being attached to a carbon atom in the chain which is separated from the acyl carbon by a chain of two to three atoms selected from the class consisting of carbon atom chains and chains containing in addition to carbon an atom from the group consisting of oxygen and sulfur.

2. A compound of the general formula

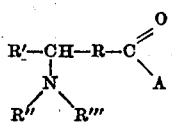

wherein R is a bivalent aliphatic hydrocarbon radical containing two to three carbon atoms in contiguous relation, R' is a monovalent aliphatic hydrocarbon radical, R'' and R''' are selected from the class of hydrogen and monovalent open chain organic radicals selected from the class consisting of carbon atom chains and chains containing in addition to carbon an atom from the group consisting of oxygen and sulfur, and R and R' are so chosen that the chain length R'—CH—R—C is at least 16 carbon atoms, A is selected from the class of OH, —OM, —OR$^{IV}$,

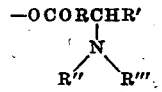

—NH$_2$, and —ONH$_4$, where M denotes a metal and R$^{IV}$ is an open chain hydrocarbon radical.

3. A compound having the general formula

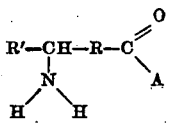

where R is a bivalent open chain organic radical, R' is a monovalent aliphatic hydrocarbon radical, and R and R' are so chosen that the chain length R'—CH—R—C is between 16 and 22 carbon atoms and the radical length N—C—R—C is 5 or 6 carbon atoms and where A is selected from the class of —OH, —OM, —OR$^{IV}$,

—OCORCHR'
  |
  NH$_2$

—NH$_2$, and —ONH$_4$, where M denotes a metal and R$^{IV}$ an open chain hydrocarbon radical.

4. 4-aminostearic acid.

HUGH WILLIAM GRAY.